UNITED STATES PATENT OFFICE.

VINCENT E. KEEGAN, OF NEW YORK, N. Y.

IMPROVEMENT IN PROCESSES OF REDUCING WOOD AND OTHER FIBROUS SUBSTANCES TO PULP.

Specification forming part of Letters Patent No. 115,740, dated June 6, 1871.

*To all whom it may concern:*

Be it known that I, VINCENT E. KEEGAN, of the city, county, and State of New York, have invented a new and useful Improvement in the Process for the Reduction of Wood and other Fibrous Vegetable Substances to Pulp suitable for the manufacture of paper; and I do hereby declare the following to be a full, clear, and exact description thereof.

My said invention relates to an improvement in the process secured to me by United States Letters Patent bearing date the 20th day of October, 1869; and my said invention consists in saturating or forcing an alkaline or acid solution into the pores of fibrous vegetable substances by hydrostatic pressure, and after drawing off the liquor, except such as is contained in the pores, subjecting the substance so saturated to the action of a high degree of heat, whereby the proximates of the plant or the substances adhering to the fibers, and by which the fibers are agglutinated or bound together, are thoroughly decomposed or reduced, so that by washing they can be effectually separated from and without injury to the fibers.

I will now describe the mode of working my said process which I prefer.

I take, by preference, any of the soft woods, such as spruce or pine, which have been sawed into thin strips of about half an inch in thickness, and cross-cut them with lengths of from six to twelve inches for the convenience of getting them into a suitable vessel. Larger or smaller pieces can be used, but the smaller the pieces the quicker the process can be worked. It will be found best to reduce the pieces to about an equal size. The pieces or chips of wood to be treated are charged into a suitable vessel through a man-hole. I prefer to use for this purpose a cylindrical vessel on a horizontal shaft, so that it can be rotated slowly during the working of the process. I prepare in a suitable vat a solution of caustic soda of about $2°.5$ gravity, and by a suitable pipe run it into the cylinder containing the wood to be treated, and the man-hole having been well and carefully closed and secured, I supply, by means of a hydraulic pump, a heavy pressure to the liquor to force it completely and thoroughly into the pores of the wood. I have found a pressure of fifty pounds to the square inch, applied for about thirty minutes, when the pieces of wood are about half an inch thick, to be sufficient; but I do not wish to be understood as limiting myself to the degree or duration of pressure, nor to the gravity or strength of the solution, as these may be varied. I have found the solution at $23°$ Baumé to answer a good purpose. After the chips have been thoroughly saturated the liquor which has not been forced into the pores of the wood is then drawn from the vessel and pumped back into the vat for use in other charges, as it is not reduced in strength by the operation of saturating the wood, and the wood so saturated with the alkaline solution is then to be subjected to a high degree of heat, which I prefer to apply in the following way: The cylinder in which the wood is saturated with the alkaline solution is formed with an outer jacket, so as to leave a steam-tight chamber all around and at the ends, (such vessels are well known in the arts,) and this chamber is then supplied with superheated steam to heat the saturated wood to a temperature of about $300°$ Fahrenheit for about two hours, at the end of which time all the proximates will have been dissolved or reduced, so that they can be separated by washing in water, which can be done in any suitable vessel with an agitator. The washing is to be continued until the water comes off clean, after which the fibers will be found to be in a suitable condition to be worked into half-stuff and then into pulp suitable for the manufacture of paper in the engines such as are usually employed for that purpose; and this can be done without or after bleaching, according to the quality or color of the paper desired to be produced.

I have discovered that after the wood has been well saturated with the alkaline solution the pores not only contain the quantity of solution required for dissolving the proximates, but that the chemical agent required to dissolve the proximates is thus brought into proximate if not in immediate contact with the substances to be dissolved or put into the required condition for being effectually separated from the fibers by the action of the heat afterward applied, and that the action is not only much more rapid, but more effectual, than when the wood or other vegetable substance is immersed in the alkaline solution, while at the same time the quantity of alkali required is much less than by any other process. The small quantity of alkali present, and the short space of time required to dissolve the proximates, by reason of the presence of the chemical agent within the pores of the wood, enable me to obtain the required result without reducing the strength of the fibers; and although I have above named caustic soda, I have done so because I have found that to be the best; but other bases of an alkaline or acid nature will answer the purpose under the mode of treatment described, as the object is to introduce into the pores of the wood the chemical agent which is to dissolve or separate the proximates from the fiber, and then applying heat to effect the chemical change without the pressure of a surrounding liquid; and although I have named wood as the substance to be treated, it will be obvious that any other fibrous vegetable substance can be treated in like manner by the said process.

What I claim as my invention, and desire to secure by Letters Patent, is—

The improved process, which consists in forcing the alkaline or acid solution into the pores of the wood or other fibrous vegetable substance by hydrostatic pressure, in combination with the after treatment of the saturated wood or other fibrous substance with a high degree of heat, substantially as and for the purpose specified.

VINCENT E. KEEGAN, M. D.

Witnesses:
 WM. H. BISHOP,
 AUG. G. PAINE.